June 21, 1955 — F. HALWARD — 2,711,157

PISTON LOCK FOR USE IN DIE CASTING AND MOLDING MACHINES

Filed May 13, 1953

INVENTOR.
FOLKE HALWARD
BY
Barnes, Kisselle, Laughlin & Raisch
ATTORNEYS.

United States Patent Office 2,711,157
Patented June 21, 1955

2,711,157

PISTON LOCK FOR USE IN DIE CASTING AND MOLDING MACHINES

Folke Halward, Detroit, Mich.

Application May 13, 1953, Serial No. 354,726

4 Claims. (Cl. 121—40)

This invention relates to piston locks for use with die casting machines and machines for molding thermoplastics where enormous hydraulic pressures are employed, something like 25,000 pounds per square inch. It is desirable that a mechanical lock be employed to hold the dies together while this enormous pressure is at work. In my prior patents, No. 2,532,768 of December 5, 1950, and No. 2,582,030 of January 8, 1952, I have described and claimed two piston locks.

My present invention is an improvement over the apparatus described and claimed in these two patents. It provides more reliable piston and cylinder arrangement to prevent leakage past the piston. It provides a rotatably adjustable ring for cooperating with the bolts in place of separate blocks, thereby making it possible to reset the position of the hard metal ring from time to time to minimize wear. It enables the use of flat one-plane surfaces in the contact between the bolts and the ring. The ring resting on the end of the cylinder will distribute the pressure from the blocks over a larger area. The contact ring is located at the end of the piston and consequently the ring and the locking block are accessible for removal or repair by sliding back the outer cylindrical casing without disassembling the piston from the cylinder. A smaller diameter piston can be used as compared to the piston in my prior Patent 2,582,030 because space and radius does not have to be provided for the movement of the bolts to cause the passageways through the bolts and the ends of the cylinder to register. In my improved apparatus there is no problem of correctly machining with the circular openings in the cylinder walls and the piston. The extra valves and valve rods employed in my two abovementioned patents are entirely eliminated. With the hard metal ring to engage with the locking blocks in place of recesses in the cylinder wall, the cylinder side walls do not have to be bored. This eliminates possible warping when the cylinder is being machined to size.

For these and other reasons my improved piston lock is much easier and cheaper to manufacture.

Referring to the drawings.

Figure 1:
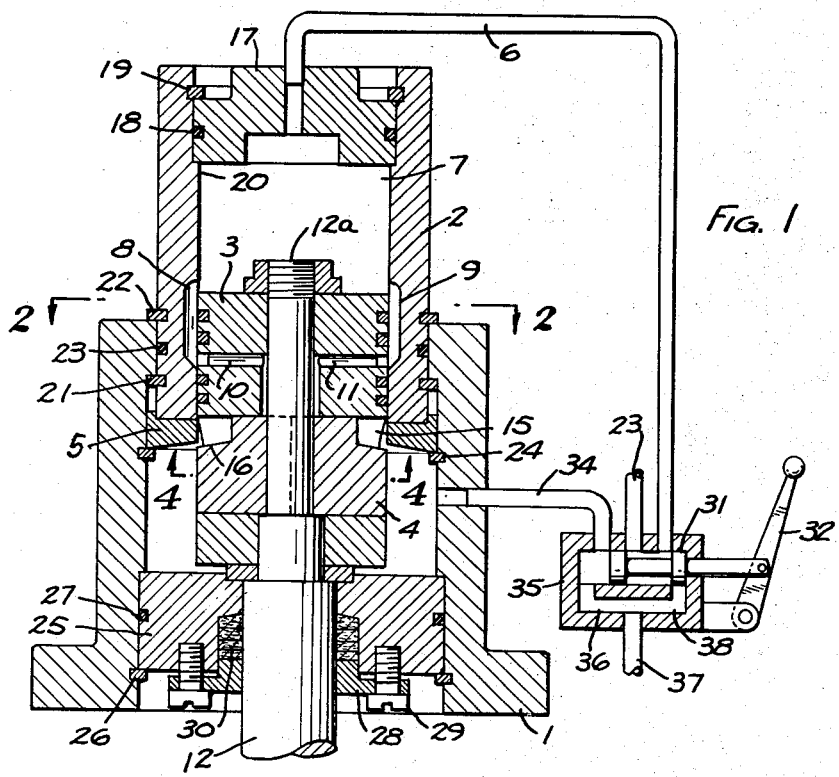
Fig. 1 is a vertical section of my improved piston rod.
Figures 3, 4:
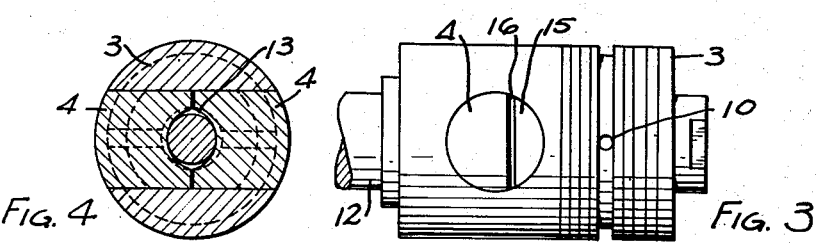
Fig. 3 is an elevation of the piston.
Fig. 4 is a section on the line 4—4 of Fig. 1.

1 is a cylindrical casing which supports the cylinder 2 in which moves the piston 3 which controls the opening and closing of the dies or mold sections (not shown). These dies when closed have pressed therein fluid metal, or the molds have fluid thermoplastic material which is forced into the dies under enormous pressures, often as much as 25,000 pounds per square inch. It is undesirable to have hydraulic pressure substantially greater than this to operate and hold closed the dies or the mold sections, so this mechanical piston lock is provided.

The two locking blocks 4 are cylindrical with the outer ends in the form of a segment of a cylinder to conform with the shape of the piston when the blocks are in their inner position withdrawn into the cylindrical passageway across the piston. The inner ends of the blocks are half elliptical in shape to straddle the piston rod and provide a passageway around the piston rod. They are expanded into locking relation with the ring 5 by means of pressure furnished through the tube 6 to the chamber 7 behind the piston 3. The hydraulic fluid passes through the shuttle passages 8 and 9 to the transverse passages 10 and 11 which take it to the center of the piston where it passes around the piston rod 12 by reason of the oval passage 13 around the piston rod. It then passes down through the elliptical passage 14 formed by the curvilinear recesses in the locking blocks 4. It causes the blocks 4 to move outwardly in the circular passageway 15 across the piston 3. These locking blocks have notches 16 machined in the top outside corner. These notches have the bottoms slightly tapered to match the taper on the bottom of the locking rings 5. This tapered bottom of the notch 16 engaging with the tapered bottom of the locking ring forms a flat surface large area contact with the locking ring and therefore spreads the large pressure endeavoring to open the dies over a larger area of the locking ring than is commonly encountered in piston locks.

The whole assembly may be put together or dismantled very easily. The cylinder 2 has a head 17 which is provided with O rings 18 to seal the head in the end of the cylinder. Snap rings 19 above the head lock the head against the shoulder 20 in the end of the cylinder. The cylinder 2 is assembled in the cylindrical casing 1 by being shoved up from the bottom. A snap ring 21 is snapped in a groove before the cylinder is pushed up in the casing. This cylinder engages against a shoulder in the end of the cylindrical casing and stops the upward movement. Then another snap ring 22 is snapped in a groove in the cylinder 2 above the top of the casing 1 and locks the cylinder in the casing. Rings 23 seal the joint. Similarly, the ring 5 is pushed up from the bottom and held in place by snap ring 24. This locking ring 5 should be of very hard metal so as to resist wear, preferably some alloyed steel such as tool steel. Before the cylinder is assembled in the casing it has the locking blocks 4 in place in the circular cross passage 15. The piston is also bolted onto the piston rod before the assembly is made. The piston is held in place in the cylindrical casing by means of the head 25 which is held in place at the top by a shoulder on the inside of the cylindrical casing and by snap ring 26 below. This lower head has the joint sealed by means of an O ring 27. Sealing washers 28 are held in place in the basin 30 by means of the cap 28 bolted on by screws 29.

The flow of the hydraulic fluid is controlled by the slide valve 31 which is controlled by lever 32. This valve can be shifted to the position shown in Fig. 1 where liquid under pressure comes through the tube 33, passes around the recess in the valve and up through the tube 6 and into the chamber 7 behind the piston 3. This pushes the piston down until the dies or mold sections close. Thereupon the fluid passes through the shuttle passages 8 and 9 to the cross passages 10, then down around the reduced portion 12a of the piston rod and into the oval passage behind the locking blocks 4. They will then spread, pushing the fluid out through passageway 34 into the end of the valve cylinder 35, then out through exhaust passage 36 and exhaust tube 37. When the die casting operation is finished the lever 32 can be reversed. This connects the pressure source tube 33 with tube 34 and pushes the blocks 4 in upon the piston rod. The liquid under pressure gets below the lower end of the piston and lifts the piston, which in turn lifts the upper die or mold section. The fluid in the chamber 27 exhausts through passage 6 past the right hand end of the piston valve through passageway 38 to exhaust tube 37.

Figure 2:
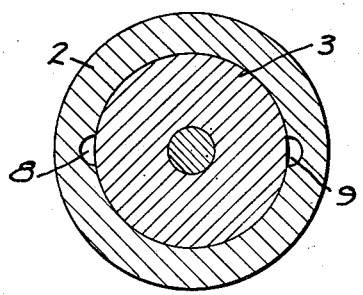
Fig. 2 is a section on the line 2—2 of Fig. 1.
Figure 5:
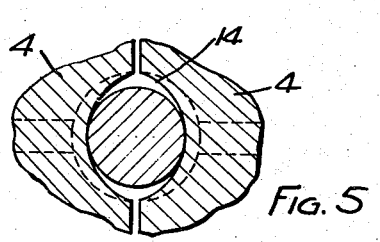
Fig. 5 is a fragmentary section on the line 4—4 of Fig. 1 showing the locking bolts expanded.

The shuttle passageways are so narrow (see Fig. 2) that there is little, if any, leakage through these passageways and around the rings. There can be little or no distortion of the rings by reason of lack of contact which occurs where a large recess or passageway is present as is the case where the locking blocks are between the ring seats as shown in Patent No. 2,532,768. The four piston rings are all located above the locking blocks and the recesses in the casing that are necessary to accommodate the expansion of the locking blocks. This insures much better sealing against pressure leakage. The valve rods, two in Patent 2,532,768, and one in Patent 2,582,030, are done away with allowing use of smaller pistons and making a cheaper, better and more reliable construction.

What I claim is:

1. A piston lock comprising a cylindrical casing having an enlarged interior at the lower end of the cylinder, a cylinder with removable top and bottom heads supported in the top of the cylindrical casing, a metal locking ring supported in the cylindrical casing below the lower end of the cylinder and having a tapered bottom, a piston rod, a piston having a cross bore near the lower end of the piston and opposite the enlarged chamber when the piston is in its lower position, said piston having piston ring grooves above this cross bore and a center opening substantially larger than the piston rod, and cross passages connecting said center opening with the exterior of the piston, said piston rod secured to the piston, piston rings in said grooves, locking blocks sliding in the cross bore of the piston and straddling the piston rod, said locking blocks notched at their upper outside corners with a notch having a tapered floor adapted to contact the tapered bottom of the locking ring when the blocks are expanded by hydraulic pressure, the said cylinder provided with one or more shuttle passages of narrow cross section which shuttle the liquid pressure from the chamber at the top of the piston to the cross passageways and the center enlarged opening around the piston rod to expand the blocks when the piston reaches its lowermost position and opens the shuttle passage to the chamber above the piston, and means for supplying and exhausting fluid pressure in the chamber above and in the chamber below the piston.

2. The combination claimed in claim 1 with the center opening through the piston and the recesses in the blocks to straddle the piston rod being a substantially oval passageway.

3. The combination claimed in claim 1 wherein the cylinder in which the piston reciprocates is removably fitted into the top of the outer cylindrical casing and locked in position by means of a shoulder on the inside of the cylindrical casing, and snap rings fitting into annular grooves to support the cylinder in fixed position in the top of the cylindrical casing, and the locking contact ring fitted below the lower end of the cylinder is held removably in this place against the lower end of the cylinder by means of a spring snap ring fitted in a groove in the inside of the cylindrical casing, whereby these snap rings and the locking contact ring may be removed and the cylinder disengaged from the outer cylindrical casing for replacement or repairs of parts.

4. The combination claimed in claim 1 in which the metal locking ring is constructed of hard metal such as tool steel.

References Cited in the file of this patent

UNITED STATES PATENTS

| 2,532,768 | Halward | Dec. 5, 1950 |
| 2,582,030 | Halward | Jan. 8, 1952 |